UNITED STATES PATENT OFFICE.

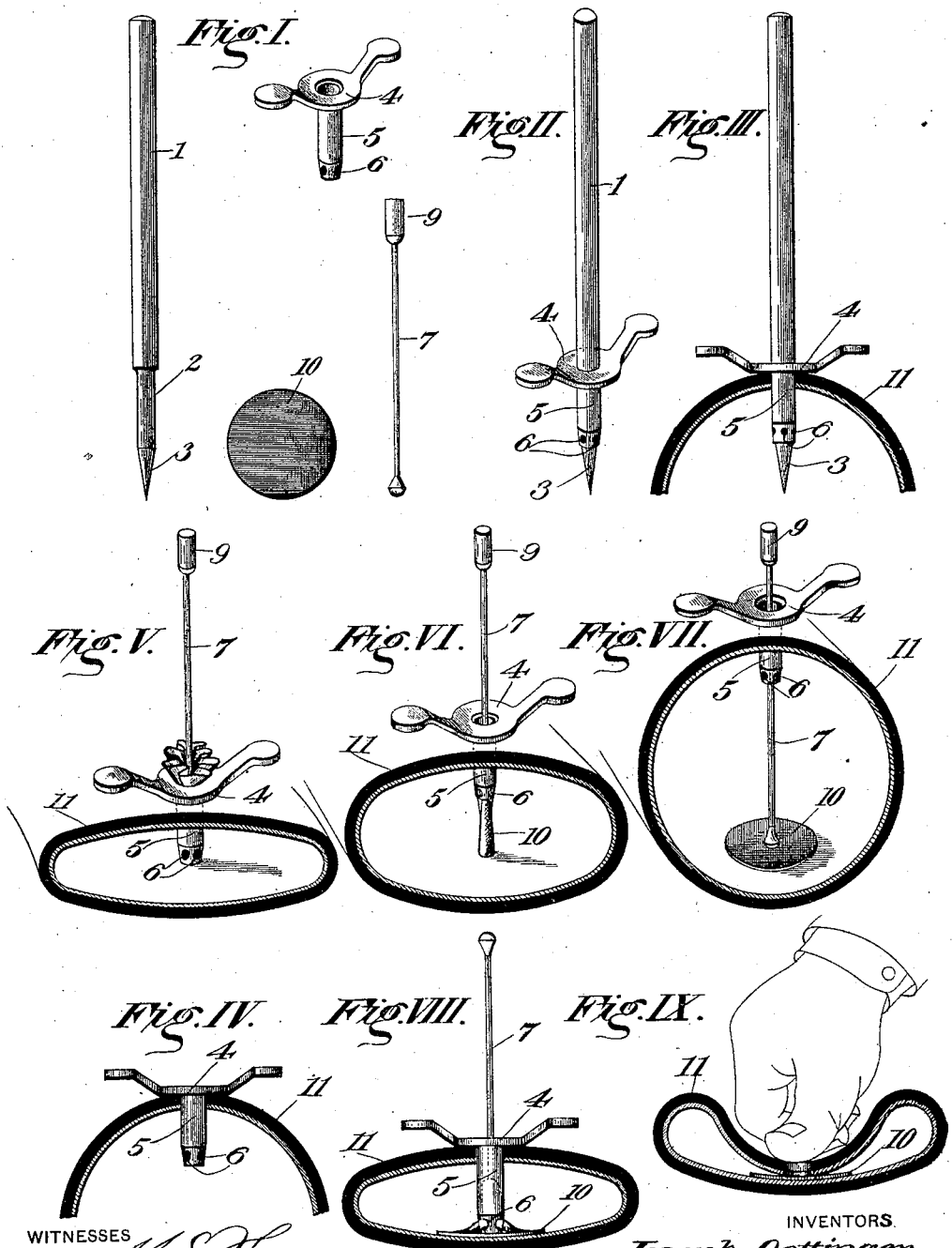

JOSEPH OETTINGER AND MINARD A. SCHUTT, OF MICHIGAN CITY, INDIANA, ASSIGNORS, BY MESNE ASSIGNMENTS, TO THE NEW YORK BICYCLE EQUIPMENT COMPANY, OF NEW YORK.

TOOL FOR MENDING PUNCTURES IN BICYCLE-TIRES.

SPECIFICATION forming part of Letters Patent No. 576,607, dated February 9, 1897.

Application filed August 26, 1895. Serial No. 560,615. (No model.)

*To all whom it may concern:*

Be it known that we, JOSEPH OETTINGER and MINARD A. SCHUTT, of Michigan City, county of La Porte, State of Indiana, have invented certain new and useful Improvements in or Relating to the Art of Closing Punctures in India-Rubber and other Articles, of which the following is a specification, reference being had to the accompanying drawings.

Our invention relates to the closing, stopping, or repairing of holes or punctures in india-rubber and other materials, and more particularly in articles whose interior surfaces are inaccessible to ordinary methods, such, for example, as pneumatic cycle-tires and the like.

Our invention consists of a certain apparatus whereby conveniently, quickly, and with certainty the minutest punctures may be effectually and permanently closed, as will hereinafter more fully and at large appear in the language employed in the detailed specification and as succinctly described in the appended claims.

In the accompanying drawings, Figure I is a group illustrating the different members that constitute our apparatus. Fig. II illustrates the penetrator and the guide-piece united. Fig. III illustrates the same inserted through the wall of a cycle-tire. Fig. IV is an illustration similar to Fig. III with the penetrator removed. Fig. V illustrates the tire compressed and the patch about to be inserted in the guide-tube. Fig. VI illustrates the same with the patch secured against the inner wall of the tire and the upper wall raised preparatory to liberating the patch. Fig. VII illustrates the patch expanded against the lower inside wall of the tire and held in place by the plunger. Fig. VIII illustrates the patch retained by the tube of the guide-piece with the piston of the plunger in the act of forcing cement upon the inner surface of the patch. Fig. IX illustrates the final step of our process, in which, the patch having been covered with cement and the apparatus removed, the punctured wall of the tire is pressed against the cement-coated surface of the patch, by which the patch is made to adhere to the inner wall of the tire, so as to cover and close the puncture.

Referring to the figures on the drawings, 1 indicates the handle part of our penetrator, which is preferably made of metal, 2 the reduced end thereof, which is preferably made integral therewith, and 3 the point.

4 indicates the flange or head of the guide-piece, from which projects at right angles a tube 5. The inner diameter of the tube 5 and the outer diameter of the reduced end 2 of the penetrator are so related to each other as to allow the reduced end 2 to fit snugly within the tube 5, as shown in Fig. II of the drawings, and when so united the length of the tube 5 is such as to render the point 3 available for the penetrator and the guide-piece.

6 indicates apertures near the end of the tube 5.

7 indicates the shank of a plunger, 8 the driving end, and 9 the piston-head thereof.

10 illustrates the patch.

The foregoing apparatus is designed to carry out our method and is well adapted for the purpose, but it will be obvious, so far as the apparatus is related to the method, that the former is susceptible of wide variations from the form illustrated in the accompanying drawings, one form being illustrated to show an example of practical means for carrying out our method, which is practiced as follows:

The operator, combining the penetrator and guide-piece, as illustrated in Fig. II of the drawings, locates the puncture in the tire 11 that is to be repaired. Then inserting the point 3 through the puncture to be repaired he separates the elastic walls of the tire until the tube 5 penetrates entirely through the wall, as shown in Fig. III. Next he removes the penetrator, leaving the tube 5 of the guide-piece in the position shown in Fig. IV. Next a patch 10 of thin rubber or other similar material, its outer surface preferably being first moistened, is fitted over the knob-like driving end 8 of the plunger, as shown in Fig. V, and is pushed down through the interior of the tube 5. During that step of the operation the walls of the tire are collapsed, as shown in Fig. V, so that the lower end of the tube 5 presses against the interior of the lower wall of the tire, which affords resistance for the plunger to drive against. When the patch around the head 8 reaches the inside of the lower wall, the upper wall may be allowed to expand, in which it may be aided by lifting lightly upon the flange 4 of the guide-piece, the plunger meanwhile being set firmly against the patch and thereby retaining the patch and the guide-piece in their proper respective positions. This step of the operation is clearly illustrated in Fig. VI of the drawings. When the patch is liberated from the tube 5, it expands through its elasticity, as shown in Fig. VII, but it and the tube 5 of the guide-piece are still retained in position by the plunger, as is shown in that figure. Retaining these relative positions through the aid of the plunger after the patch has expanded, as it must when liberated from the tube 5, the operator presses upon the flange 4 and forces the lower end of the tube 5 against the surface of the patch, thereby confining it independently of the plunger in the required position. The plunger may then be withdrawn without danger of dislocating the patch. With the tube 5 of the guide-piece holding the patch securely the operator, having withdrawn the plunger, fills the tube 5 from the outside with a liquid cement, or so much of it as may be required. Then reversing the plunger and inserting the piston-head 9 into the tube 5, which it snugly fits, he presses upon the plunger and forces the cement through the openings 6 of the tube 5 and distributes it over the inner surface of the patch, while the surface next to the lower wall of the tire is kept clean. Having covered the patch in the manner described, the operator withdraws the plunger, and, pressing the punctured wall of the tire down against the patch, withdraws the tube 5, and, finally, after the withdrawal of the tube, pressing the punctured part smoothly and evenly over the cement-covered surface of the patch, secures the patch upon the inner wall of the tire around the puncture. Having completed the operation of setting the patch, the tire is released and expands to its normal position. It should preferably be inflated promptly after the patch has been set, in order to keep the patch well in position until the cement is set.

The capacity of the tube 5 may be proportioned to the size of the patch 10, so that the cement that the former will contain will be just enough to properly cover the latter and thus avoid the escape of cement from the surfaces designed to be united.

What we claim is—

1. In apparatus for repairing punctures in cycle-tires or the like, a guide-piece provided with a hollow part or tube having transverse apertures through its wall, substantially as specified.

2. In apparatus for repairing punctures in cycle-tires or the like, the combination with the hollow guide-piece provided with transverse apertures near one extremity, of a plunger provided with an enlarged end capable of being passed entirely through the hollow guide-piece and into the tire to be repaired, substantially as specified.

3. In apparatus for repairing punctures in cycle-tires or the like, the combination with a hollow guide-piece provided with a flange at one end and with transverse apertures adjacent to its opposite end, of a penetrator-handle provided with a reduced pointed end designed to fit within and to project beyond the hollow guide-piece for inserting the latter in the puncture, and a reversible plunger provided with a rounded driving end and with a piston-head at its opposite extremity, substantially as specified.

JOSEPH OETTINGER.
MINARD A. SCHUTT.

Witnesses:
H. A. SCHUAGER,
W. A. CORBLY.